United States Patent
Davis et al.

(10) Patent No.: US 6,578,013 B1
(45) Date of Patent: Jun. 10, 2003

(54) METHOD AND SYSTEM FOR COMMUNICATING BETWEEN SUPPLIER AND CUSTOMER DEVICES

(75) Inventors: Rose King Davis, Austin, TX (US); Robert L. McMahan, Cedar Park, TX (US); John Pate, Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/441,982

(22) Filed: Nov. 17, 1999

(51) Int. Cl.[7] .............................................. G06F 17/60
(52) U.S. Cl. ........................................... 705/26; 705/28
(58) Field of Search .............................. 705/22, 26, 27, 705/28, 29

(56) References Cited

U.S. PATENT DOCUMENTS

| | | | |
|---|---|---|---|
| 5,442,771 A | 8/1995 | Filepp et al. | |
| 5,455,903 A | 10/1995 | Jolissaint et al. | |
| 5,710,887 A | 1/1998 | Chelliah et al. | |
| 5,712,989 A | * 1/1998 | Johnson et al. | 705/22 |
| 5,715,314 A | 2/1998 | Payne et al. | 705/26 |
| 5,727,163 A | 3/1998 | Bezos | 705/27 |
| 5,732,400 A | 3/1998 | Mandler et al. | 705/26 |
| 5,787,438 A | 7/1998 | Cink et al. | 707/103 |
| 5,799,285 A | 8/1998 | Klingman | |
| 5,870,717 A | * 2/1999 | Wiecha et al. | 705/26 |
| 5,983,202 A | * 11/1999 | Yabe et al. | 705/28 |
| 6,041,307 A | * 3/2000 | Ahuja et al. | 705/26 |
| 6,072,493 A | * 6/2000 | Driskell et al. | 705/26 |
| 6,078,900 A | * 6/2000 | Ettl et al. | 705/28 |
| 6,192,518 B1 | * 2/2001 | Neal | 709/221 |
| 6,230,199 B1 | * 5/2001 | Revashetti et al. | 705/28 |
| 6,249,774 B1 | * 6/2001 | Roden et al. | 705/28 |
| 6,324,520 B1 | * 11/2001 | Walker et al. | 705/28 |
| 6,370,586 B2 | * 4/2002 | Davis et al. | 709/244 |

FOREIGN PATENT DOCUMENTS

| | | | | |
|---|---|---|---|---|
| JP | 02129787 A | * | 5/1990 | G07F/9/00 |
| JP | 2001356911 A | * | 12/2001 | G06F/9/445 |

OTHER PUBLICATIONS

"IRT Corporation Announces Advanced Inspection System for SMT–based Circuit Boards" Oct. 1, 1987, News Release, p. 1.*

Krepchin, Ira, "Sensors—The Front Line for MH Equipment Control", Jul. 1987, Modern Materials Handling, vol. 42, No. 8, pp. 91–94.*

* cited by examiner

Primary Examiner—Robert P. Olszewski
Assistant Examiner—Bryan Jaketic
(74) Attorney, Agent, or Firm—Michael A. Davis, Jr.; Haynes and Boone, LLP

(57) ABSTRACT

A system includes a computing device for storing criteria under which a customer is authorized to purchase a physical item. The computing device receives a request from the customer. In response to the request satisfying the stored criteria, the computing device outputs a signal for purchasing the physical item. The stored criteria may include a monetary budget for purchasing the physical item. The computing device is for modifying the stored criteria to reduce the monetary budget in response to the signal.

45 Claims, 8 Drawing Sheets

| | | |
|---|---|---|
| CUSTOMER NAME | MARY ANN SPECK | SETH PLATE |
| MANUFACTURER'S SERIAL NUMBER OF EXISTING PC | 3X2JY | UU24G |
| CUSTOMER TYPE | INFREQUENT SHOPPER | FREQUENT SHOPPER |
| TOTAL PURCHASES IN LAST YEAR | $1,239 | $9,439 |
| COMPONENTS IN EXISTING SYSTEM | 64 MEGABYTE RAM | 128 MEGABYTE RAM |
| | 2 GIGABYTE HARD DRIVE | 9 GIGABYTE HARD DRIVE |
| ... | ... | ... |
| COMPONENTS PREVIOUSLY ADDED TO SYSTEM | 15" MONITOR<br>ZIP DRIVE | EXTRA 32 MEGABYTE RAM<br>21" MONITOR |
| ITEMS CURRENTLY ON ORDER | DVD | PALM PILOT |
| ITEMS RETURNED | ZIP DRIVE | NONE |
| ESTIMATED TIME OF ARRIVAL FOR ITEMS CURRENTLY ON ORDER | 2 WEEKS | 1 WEEK |
| TARGETING CUSTOMER FOR THESE PROMOTIONAL ITEMS | TOTAL SYSTEM REPLACEMENT. EXISTING SYSTEM MORE THAN 3 YEARS OLD. CUSTOMER LIKES TO BUY TURNKEY SYSTEM.<br>PORTAL SERVICE | CABLE MODEM<br>PORTAL SERVICE |
| SYSTEM RESOURCES TO MONITOR | HD, RAM, PROCESSOR SPEED | HD, RAM |

*Fig. 7*

| EMPLOYEE NAME | ROSE DAVIS | JOHN ZOGLIN |
|---|---|---|
| MANUFACTURER'S SERIAL NUMBER OF EXISTING PC | 3X2JY | UU24G |
| COMPANY'S ASSET TAG NUMBER | 12345 | 12346 |
| EMPLOYEE TYPE | SENIOR MANAGER | DIRECTOR |
| COST CENTER OF EMPLOYEE | 1103-5003 | 1103-5003 |
| RANKING WITHIN COST CENTER | 3 | 1 |
| AVAILABLE FUNDS (BASED ON MONEY IN COST CENTER AND RANKING WITHIN COST CENTER) | $1,200 | $4,000 |
| COMPONENTS IN EXISTING SYSTEM | 64 MEGABYTE RAM | 128 MEGABYTE RAM |
| | 2 GIGABYTE HARD DRIVE | 9 GIGABYTE HARD DRIVE |
| | ⋮ | ⋮ |
| COMPONENTS PREVIOUSLY ADDED TO SYSTEM | EXTRA 32 MEGABYTE RAM ZIP DRIVE | NONE |
| ITEMS CURRENTLY ON ORDER | DVD | ZIP DRIVE |
| ITEMS RETURNED | ZIP DRIVE | NONE |
| ESTIMATED TIME OF ARRIVAL FOR ITEMS CURRENTLY ON ORDER | 2 WEEKS | 1 WEEK |
| ITEMS ALLOWED FOR PROACTIVE SHOP | ZIP DRIVE<br>VISIO SOFTWARE<br>(DVD; NOT AVAILABLE BECAUSE ALREADY PURCHASED)<br>(32 Mg RAM; NOT AVAILABLE BECAUSE ALREADY PURCHASED) | DVD<br>64 Mg RAM<br>VISIO SOFTWARE<br>FINANCE SOFTWARE PACKAGE<br>PALM PILOT<br>(ZIP DRIVE; NOT AVAILABLE BECAUSE ALREADY PURCHASED) |
| SYSTEM RESOURCES TO MONITOR | HD, RAM, PROCESSOR SPEED | HD, RAM |

*Fig. 8a*

| | | |
|---|---|---|
| CUSTOMER NAME | ACME CORPORATION, INC. | WIDGET CORPORATION, INC. |
| EMPLOYEE NAME | ROSE DAVIS | JOHN ZOGLIN |
| MANUFACTURER'S SERIAL NUMBER OF EXISTING PC | 3X2JY | UU24G |
| COMPANY'S ASSET TAG NUMBER | 12345 | 12346 |
| EMPLOYEE TYPE | SENIOR MANAGER | DIRECTOR |
| COST CENTER OF EMPLOYEE | 1103-5003 | 1103-5003 |
| RANKING WITHIN COST CENTER | 3 | 1 |
| AVAILABLE FUNDS (BASED ON MONEY IN COST CENTER AND RANKING WITHIN COST CENTER) | $1,200 | $4,000 |
| COMPONENTS IN EXISTING SYSTEM | 64 MEGABYTE RAM | 128 MEGABYTE RAM |
| | 2 GIGABYTE HARD DRIVE | 9 GIGABYTE HARD DRIVE |
| ⋮ | ⋮ | ⋮ |
| COMPONENTS PREVIOUSLY ADDED TO SYSTEM | EXTRA 32 MEGABYTE RAM ZIP DRIVE | NONE |
| ITEMS CURRENTLY ON ORDER | DVD | ZIP DRIVE |
| ITEMS RETURNED | ZIP DRIVE | NONE |
| ESTIMATED TIME OF ARRIVAL FOR ITEMS CURRENTLY ON ORDER | 2 WEEKS | 1 WEEK |
| ITEMS ALLOWED FOR PROACTIVE SHOP | ZIP DRIVE<br>VISIO SOFTWARE<br>(DVD; NOT AVAILABLE BECAUSE ALREADY PURCHASED)<br>(32 Mg RAM; NOT AVAILABLE BECAUSE ALREADY PURCHASED) | DVD<br>64 Mg RAM<br>VISIO SOFTWARE<br>FINANCE SOFTWARE PACKAGE<br>PALM PILOT<br>(ZIP DRIVE; NOT AVAILABLE BECAUSE ALREADY PURCHASED) |
| SYSTEM RESOURCES TO MONITOR | HD, RAM, PROCESSOR SPEED | HD, RAM |

*Fig. 8b*

METHOD AND SYSTEM FOR COMMUNICATING BETWEEN SUPPLIER AND CUSTOMER DEVICES

This application relates to co-pending U.S. application Ser. No. 09/009,401, filed on Jan. 20, 1998, entitled METHOD AND APPARATUS FOR PROVIDING AND ACCESSING DATA AT AN INTERNET SITE, naming Amy Van Wyngarden as inventor; U.S. application Ser. No. 09/012,962, filed in Jan. 26, 1998, entitled GENERATION OF A COMPATIBLE ORDER FOR A COMPUTER SYSTEM, naming Alan E. Beelitz and Paul J. Maia as inventors; and U.S. application Ser. No. 09/158,564, filed in Sep. 22, 1998, entitled METHOD AND APPARATUS FOR PROVIDING CUSTOMER CONFIGURED MACHINES AT AN INTERNET SITE, naming Ken Henson as inventor. The co-pending applications are incorporated by reference in their entirety, and are assigned to the assignee of this invention.

BACKGROUND

The disclosures herein relate in general to information processing systems and in particular to a method and system for communicating between supplier and customer devices.

As businesses increase their reliance upon electronic information computing systems, the number of such computing systems increases rapidly on a daily basis. The management of such computing systems is a serious challenge to such businesses. For example, businesses have an incentive to maintain operational reliability of their various computing systems, plus compatibility and configuration consistency between their various computing systems. Moreover, businesses have an incentive to efficiently manage costs associated with such management.

In performing such management, businesses rely on assistance from suppliers of the computing systems. The businesses are customers of the suppliers. A supplier can help such customers by providing information about compatibility between a customer's various computing systems, and by maintaining records of configuration consistency between a customer's various computing systems. Also, a supplier can provide operational repairs and upgrades of a customer's computing systems. Moreover, the supplier can promptly notify a customer about new products and changes in price and/or availability of products.

Previous techniques have relied heavily on humans to perform such management. However, with increases in the numbers and different types of customers and computing systems, such human management becomes less reliable. Moreover, the monetary cost of such human management is economically inefficient.

Accordingly, a need has arisen for a method and system for communicating between supplier and customer devices, in which various shortcomings of previous techniques are overcome. More particularly, a need has arisen for a method and system for communicating between supplier and customer devices, in which less reliance on human management is achieved.

SUMMARY

One embodiment, accordingly, provides a method and system for communicating between supplier and customer devices wherein less reliance of human management is achieved. To this end, a system includes a computing device for storing criteria under which a customer is authorized to purchase a physical item. The computing device receives a request from the customer. In response to the request satisfying the stored criteria, the computing device outputs a signal for purchasing the physical item.

A principal advantage of this embodiment is that (a) various shortcomings of previous techniques are overcome, and (b) less reliance on human management is achieved.

BRIEF DESCRIPTION OF THE DRAWING

FIG. 7 is a conceptual illustration of the organization of customer database 308 according to a first illustrative embodiment.

FIG. 8a is a conceptual illustration of the organization of customer database 308 according to a second illustrative embodiment.

FIG. 8b is a conceptual illustration of the organization of customer database 308 according to a third illustrative embodiment.

DETAILED DESCRIPTION

Figure 1:
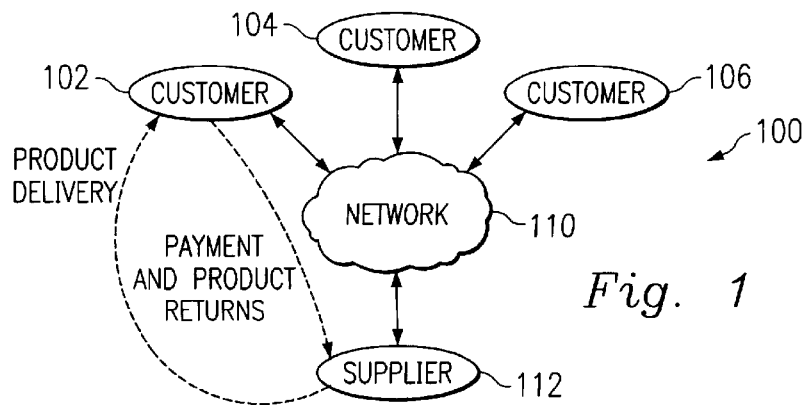
FIG. 1 is a block diagram of a system according to the illustrative embodiment.

FIG. 1 is a block diagram of a system, indicated generally at 100, according to the illustrative embodiment. System 100 includes customers 102, 104 and 106, each for executing respective customer processes as discussed further hereinbelow in connection with FIG. 3. Further, system 100 includes (a) a global computer network 110, such as a Transport Control Protocol/Internet Protocol ("TCP/IP") network 110 (e.g. the Internet or an intranet), and (b) a supplier 112 for executing supplier processes as discussed further hereinbelow in connection with FIG. 6.

Each of customers 102, 104 and 106 (and supplier 112) includes a respective network interface for communicating with network 110 (i.e. outputting information to, and receiving information from, network 110), such as by transferring information (e.g. instructions, data, signals) between such customer (or supplier) and network 110. Each of customers 102, 104 and 106, network 110, and supplier 112 is a computing system that includes at least one respective computing device (e.g. computer) for executing a respective process and performing respective operations (e.g. processing and communicating information) in response thereto as discussed further hereinbelow. Each such computing system and computing device is formed by various electronic circuitry components.

Also, as shown in FIG. 1, supplier 112 is coupled through network 110 to each of customers 102, 104 and 106.

Through network 110, information is communicated by supplier 112, and by customers 102, 104 and 106, to one another. In the discussion hereinbelow, customer 102 is a representative one of customers 102, 104 and 106. Although FIG. 1 shows only three customers (i.e. customers 102, 104 and 106), it should be understood that other customers (substantially identical to customers 102, 104 and 106) are connected to network 110.

Further, as shown in FIG. 1, supplier 112 communicates with customers 102, 104 and 106 by causing delivery of physical items (e.g., (a) physical copies of computer software products or (b) other products such as floppy diskettes, hard disks, memory devices or other computer components) to customers 102, 104 and 106. Supplier 112 causes such delivery in response to an order for purchase of a physical item. Customers 102, 104 and 106 are operable to transmit such an order electronically through network 110 to supplier 112.

For certain physical items (e.g. physical copies of computer software products), supplier 112 is operable to cause such delivery electronically through network 110 to customers 102, 104 and/or 106. In this regard, physical items are distinguished from services. For example, relative to physical items, services are ephemeral. Unlike services, physical items are physically retained at the delivery destination after delivery thereof. Accordingly, if such delivery destination is one of customers 102, 104 or 106, such physical items (during or after such delivery thereof) are installable at a computing system (e.g. in a computing device) of such customer.

Moreover, customers 102, 104 and 106 communicate with supplier 112 by causing delivery of payment to supplier 112 (e.g. in exchange for receipt of physical items from supplier 112), or by causing delivery of physical items to supplier 112 (e.g. return of products).

Figure 2:
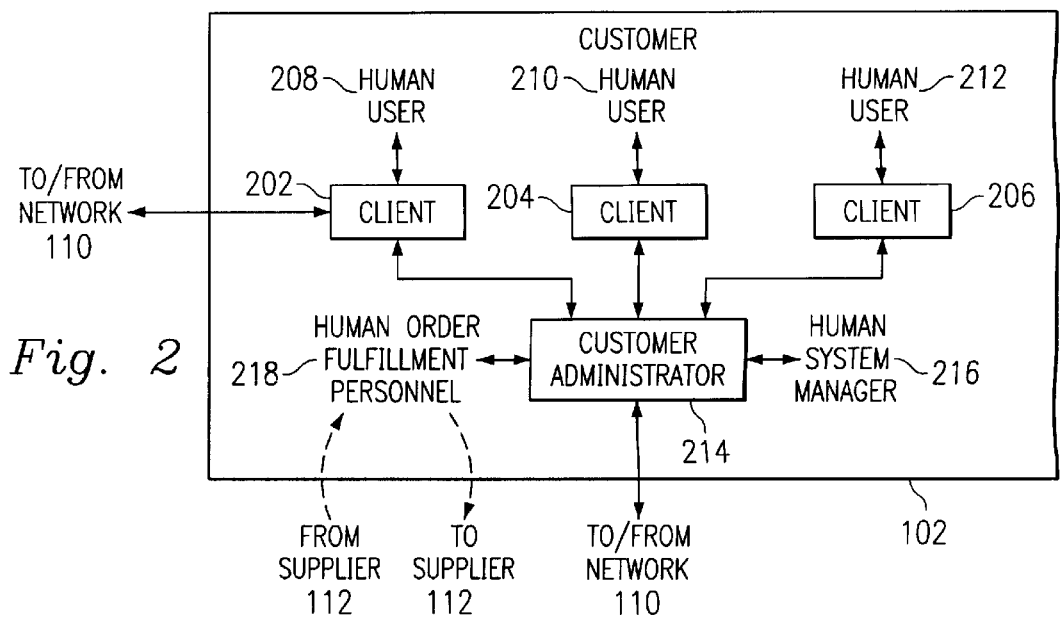
FIG. 2 is a block diagram of a customer of the computer system of FIG. 1.

FIG. 2 is a block diagram of customer 102. Customer 102 includes clients 202, 204, and 206, which are computing systems including respective computing devices (e.g. IBM-compatible personal computers), each for executing a respective client process. Also, customer 102 includes human users 208, 210 and 212. Clients 202, 204 and 206 operate in association with human users 208, 210 and 212, respectively.

Further, customer 102 includes a customer administrator 214, which is a computing system including a computing device, for executing customer administrator processes as discussed further hereinbelow in connection with FIG. 3. Customer administrator 214 operates in association with a human system manager 216 and human order fulfillment personnel 218, which are users of customer administrator 214, as discussed further hereinbelow in connection with FIG. 4. The operation of customer administrator 214 in association with human system manager 216 and human order fulfillment personnel 218 is similar to the manner in which clients 202, 204 and 206 operate in association with human users 208, 210 and 212, respectively.

Human order fulfillment personnel 218 communicate between customer 102 and supplier 112 by receiving delivery of physical items from supplier 112, by causing delivery of payment to supplier 112, and/or by causing return delivery of physical items to supplier 112. On behalf of customer 102, customer administrator 214 includes a respective network interface for communicating with network 110, such as by transferring information between customer administrator 214 and network 110. Also, as shown in FIG. 2, customer administrator 214 is coupled to each of clients 202, 204 and 206, and information is communicated between customer administrator 214 and clients 202, 204 and 206.

In the discussion hereinbelow, client 202 is a representative one of clients 202, 204 and 206. Although FIG. 2 shows only three clients (i.e. clients 202, 204 and 206), it should be understood that other clients (substantially identical to clients 202, 204 and/or 206) are coupled to customer administrator 214. Likewise, each of such other clients operates in association with a respective human user, similar to the manner in which client 202 operates in association with user 208.

Moreover, as shown in FIG. 2, in the illustrative embodiment, client 202 is connected to network 110. Accordingly, client 202 is coupled through network 110 to supplier 112 (FIG. 1). Likewise, as with representative client 202, each of clients 204 and 206 is coupled through network 110 to supplier 112, although such coupling is not shown in FIG. 2 for clarity. In view of such coupling, one or more of clients 202, 204 or 206 is operable in alternative embodiments to perform the processes (discussed further hereinbelow in connection with FIG. 3) of customer administrator 214.

Figure 3:
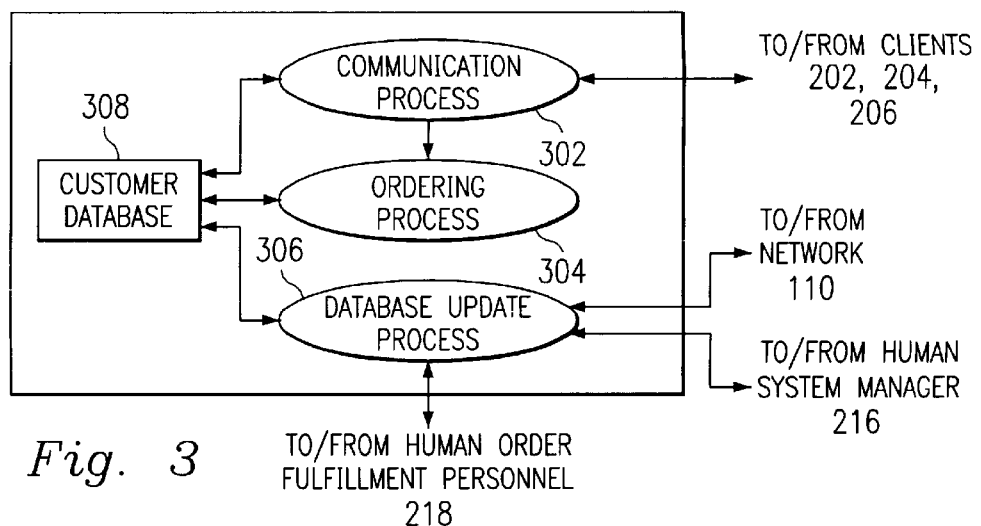
FIG. 3 is a conceptual illustration of various processes executed by a customer administrator system of the customer of FIG. 2.

FIG. 3 is a conceptual illustration of various processes executed by customer administrator 214 of FIG. 2. More particularly, such processes are executed by a computer 402 of FIG. 4, which is discussed further hereinbelow. The processes shown in FIG. 3 are illustrative, and not exhaustive, of the processes executed by customer administrator 214 in general and computer 402 (FIG. 4) in particular.

Figure 9:
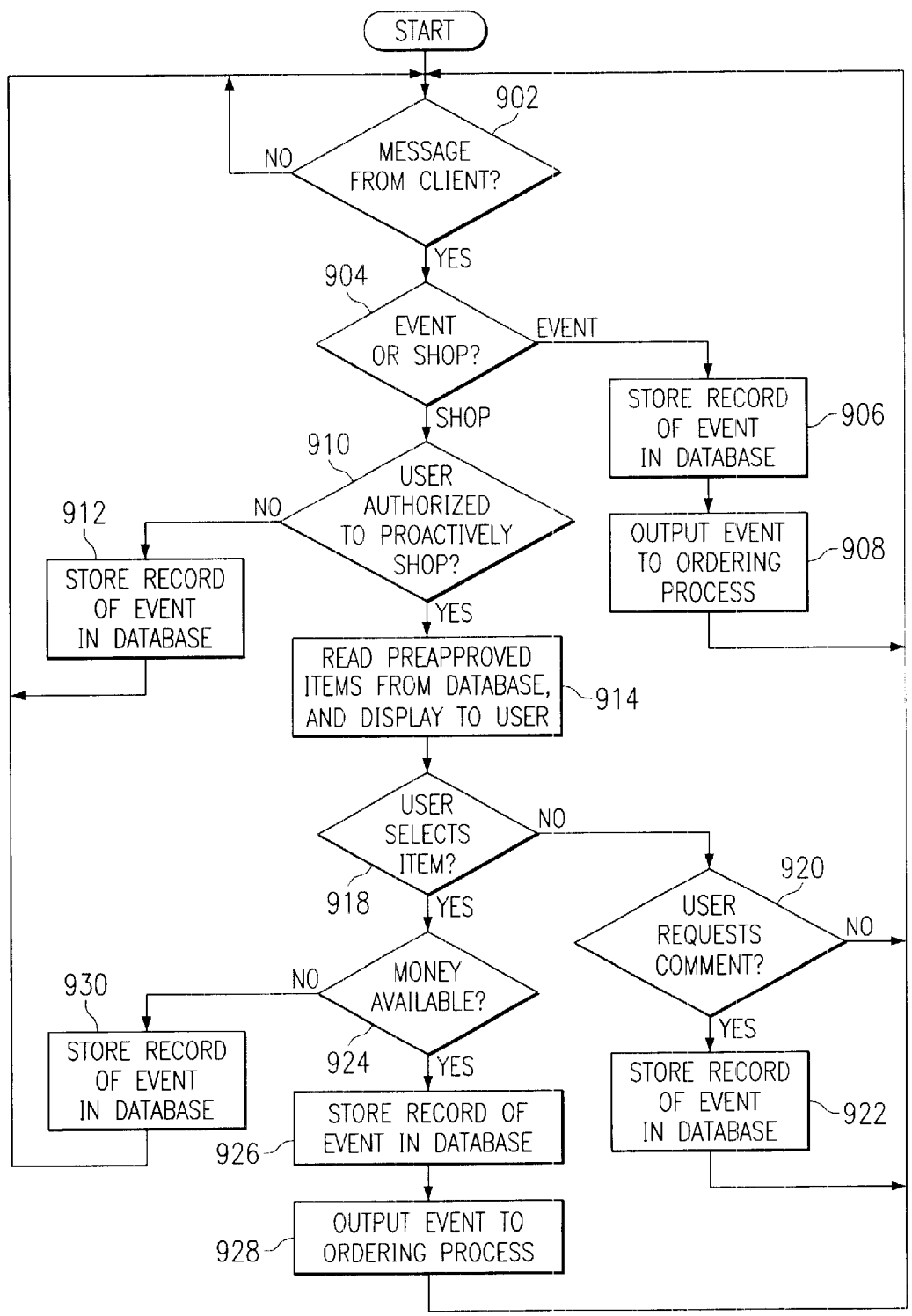
FIG. 9 is a flowchart of operation of a communication process of FIG. 3.
Figure 10:
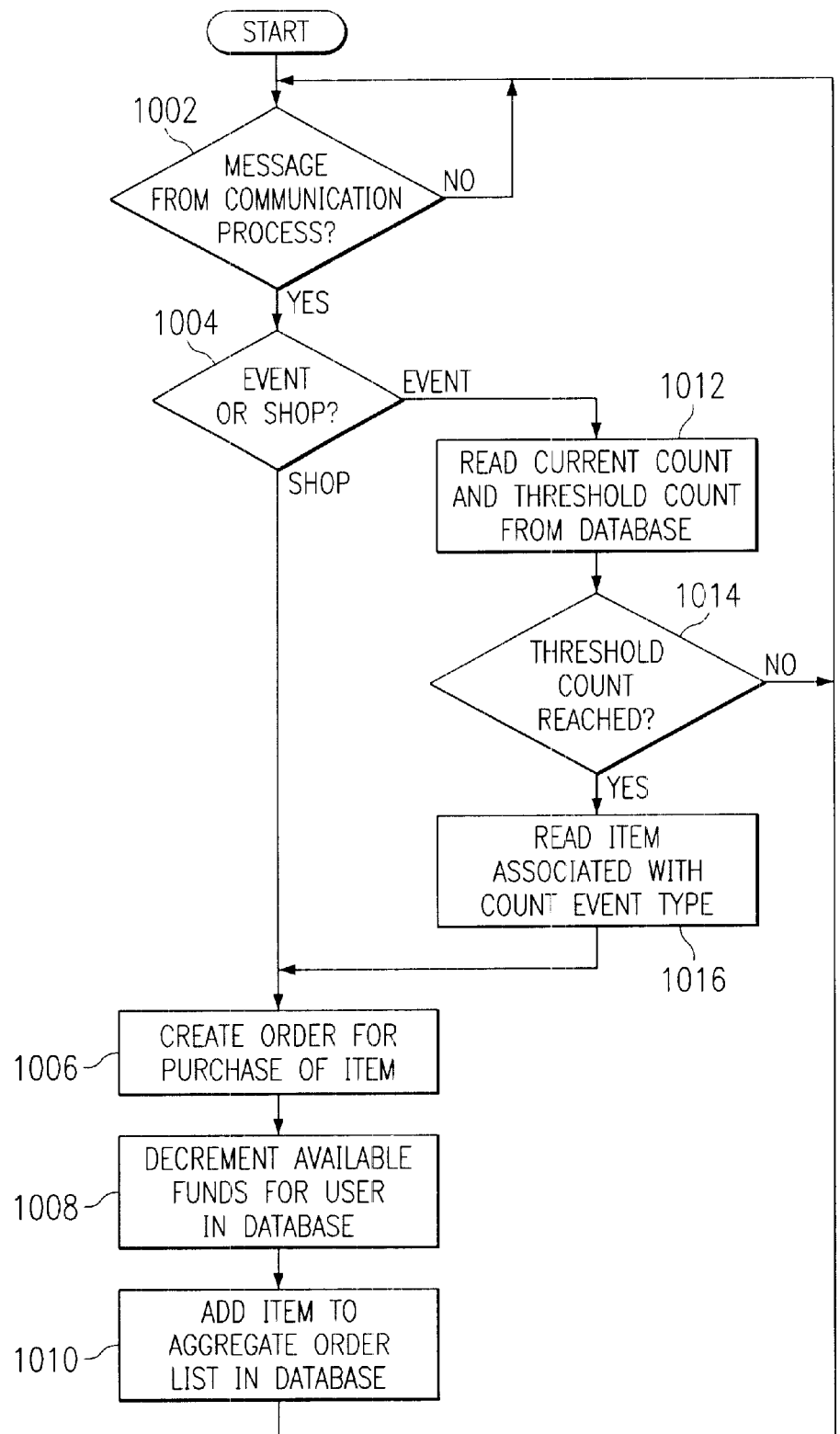
FIG. 10 is a flowchart of operation of an ordering process of FIG. 3.
Figure 11:
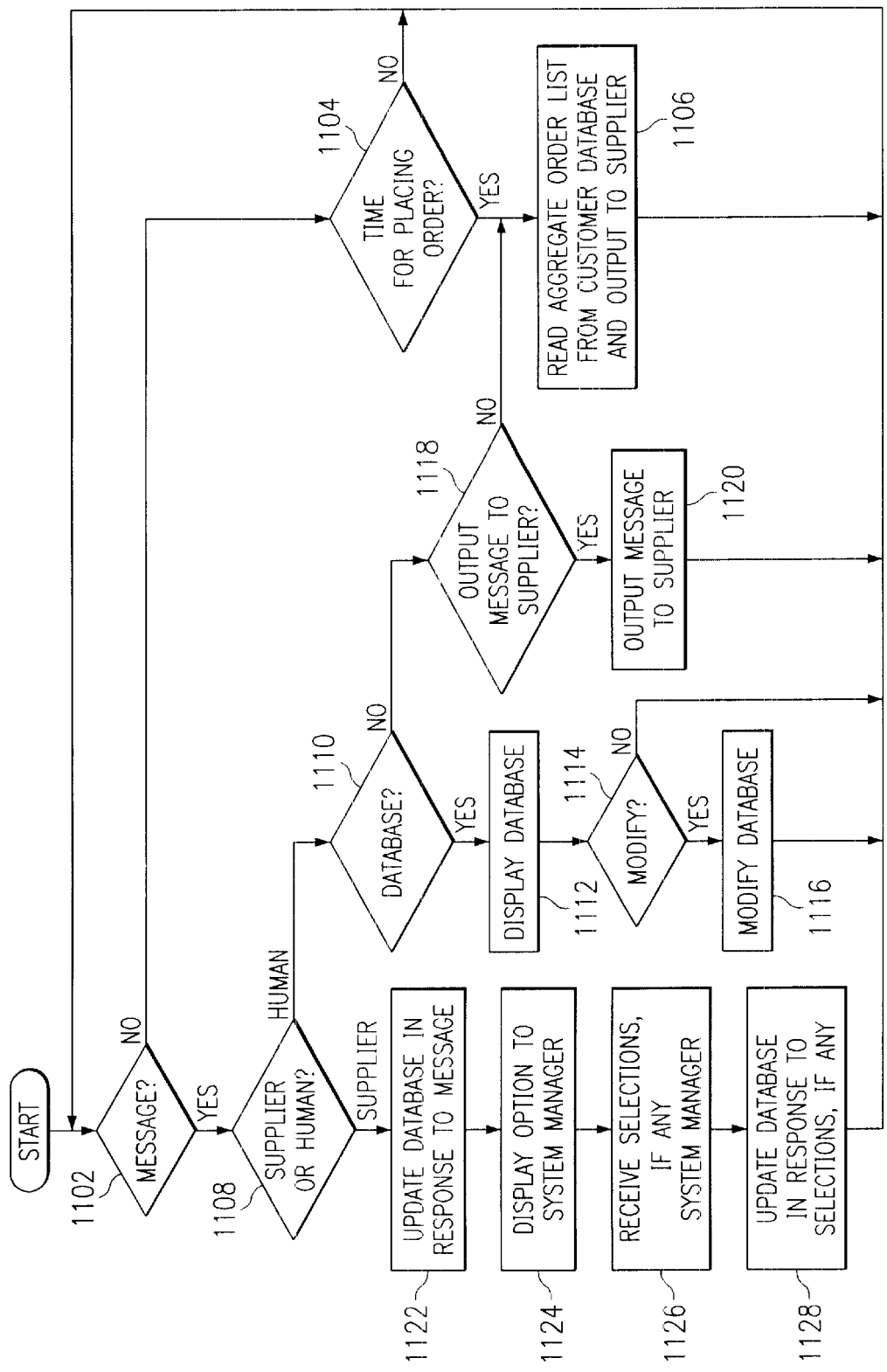
FIG. 11 is a flowchart of operation of a database update process of FIG. 3.

The processes executed by customer administrator 214 are discussed in more detail elsewhere herein, as for example in connection with FIGS. 9, 10 and 11. As shown in FIG. 3, customer administrator 214 executes a communication process 302 (discussed further hereinbelow in connection with FIG. 9), an ordering process 304 (discussed further hereinbelow in connection with FIG. 10), and a database update process 306 (discussed further hereinbelow in connection with FIG. 11). Such processes perform operations to communicate with a customer database 308, which is stored within hard disk 411 (discussed further hereinbelow in connection with FIG. 4).

The organization of customer database 308 is discussed further hereinbelow in connection with FIGS. 7 and 8. Customer administrator 214 operates to store, within customer database 308, a record of various operations performed by customer administrator 214.

Communication process 302 performs operations to communicate between customer administrator 214 and clients 202, 204 and 206, as discussed further hereinbelow in connection with FIG. 9. Also, communication process 302 communicates with ordering process 304, as discussed further hereinbelow in connection with FIGS. 9 and 10. Database update process 306 performs other operations of customer administrator 214, e.g. including operations to communicate between customer administrator 214 and (a) network 110, (b) human systems manager 216, and (c) human order fulfillment personnel 218, as discussed further hereinbelow in connection with FIG. 11.

For example, database update process 306 performs operations to communicate information between customer administrator 214 and human order fulfillment personnel 218 about delivery of physical items from supplier 112, delivery of payment to supplier 112, and/or return delivery of physical items to supplier 112.

Figure 4:
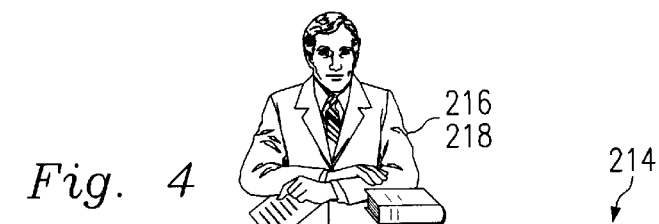
FIG. 4 is a block diagram of the customer administrator system of the customer of FIG. 2.

FIG. 4 is a block diagram of customer administrator 214. In the discussion of FIG. 4 hereinbelow, customer administrator 214 is a representative one of the computing systems of customer 102, network 110, and supplier 112.

As shown in FIG. 4, customer administrator 214 includes (a) input devices 404 for receiving information from a human user (e.g. 216, 218), (b) a display device 406 (e.g. a conventional electronic cathode ray tube ("CRT") device) for displaying information to a user (e.g. 216, 218), (c) a computer 402 for executing and otherwise processing instructions, (h) a print device 408 (e.g. a conventional electronic printer or plotter), (e) a computer-readable medium (or apparatus) 410 for storing information, (d) a nonvolatile storage device 411 (e.g. a disk drive or other computer-readable medium (or apparatus), as discussed further hereinbelow) for storing information, and (e) various other electronic circuitry for performing other operations of customer administrator 214.

In the illustrative embodiment, computer 402 is an IBM-compatible computer that executes Microsoft Windows NT operating system ("OS") software, or alternatively is any computer that executes any OS. All Microsoft products identified herein are available from Microsoft Corporation, One Microsoft Way, Redmond, Wash. 98052-6399, telephone (425) 882–8080. For example, computer 402 includes (a) a network interface (e.g. asynchronous transfer mode ("ATM") circuitry) for communicating between computer 402 and network 110 and (b) a memory device (e.g. random access memory ("RAM") device and read only memory ("ROM") device) for storing information (e.g. instructions executed by computer 402 and data operated upon by computer 402 in response to such instructions).

Accordingly, computer 402 is connected to network 110, input devices 404, display device 406, print device 408, computer-readable medium 410, and storage device 411, as shown in FIG. 4. Customer administrator 214 and user 216 operate in association with one another. Also, customer administrator 214 and users 218 operate in association with one another.

For example, in response to signals from computer 402, display device 406 displays visual images, and a user (e.g. 216, 218) views such visual images. Moreover, a user (e.g. 216, 218) operates input devices 404 in order to output information to computer 402, and computer 402 receives such information from input devices 404. Also, in response to signals from computer 402, print device 408 prints visual images on paper, and a user (e.g. 216, 218) views such visual images.

Input devices 404 include, for example, a conventional electronic keyboard and a pointing device such as a conventional electronic "mouse", rollerball or light pen. A user (e.g. 216, 218) operates the keyboard to output alphanumeric text information to computer 402, and computer 402 receives such alphanumeric text information from the keyboard. A user (e.g. 216, 218) operates the pointing device to output cursor-control information to computer 402, and computer 402 receives such cursor-control information from the pointing device.

Figure 5:
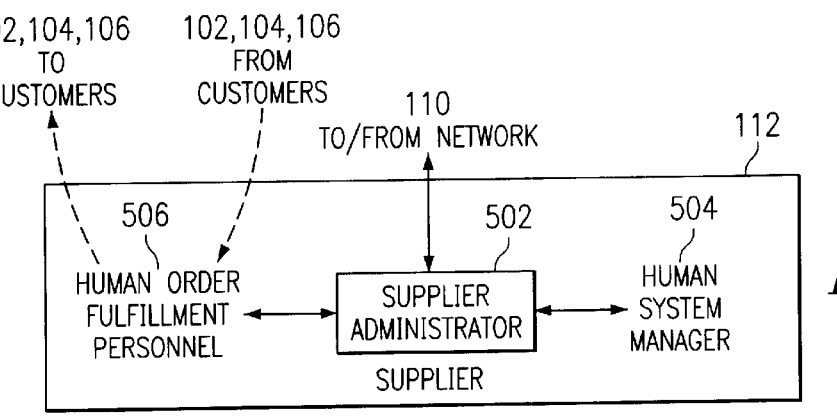
FIG. 5 is a block diagram of a supplier of the computer system of FIG. 1.

FIG. 5 is a block diagram of supplier 112. Supplier 112 includes a supplier administrator 502, which is a computing system including a computing device, for executing supplier administrator processes as discussed further hereinbelow in connection with FIG. 6. Also, supplier. 12 includes a human system manager 504 and human order fulfillment personnel 506, which are users of supplier administrator 502.

Supplier administrator 502 operates in association with human system manager 504 and human order fulfillment personnel 506, similar to the manner in which customer administrator 214 operates in association with a human system manager 216 and human order fulfillment personnel 218. Human order fulfillment personnel 506 communicate between supplier 112 and customers 102, 104 and 106 by causing delivery of physical items to such customers, by receiving delivery of payment from such customers, and/or by receiving return delivery of physical items from such customers. On behalf of supplier 112, supplier administrator 502 includes a respective network interface for communicating with network 110, such as by transferring information between supplier administrator 502 and network 110.

Figure 6:
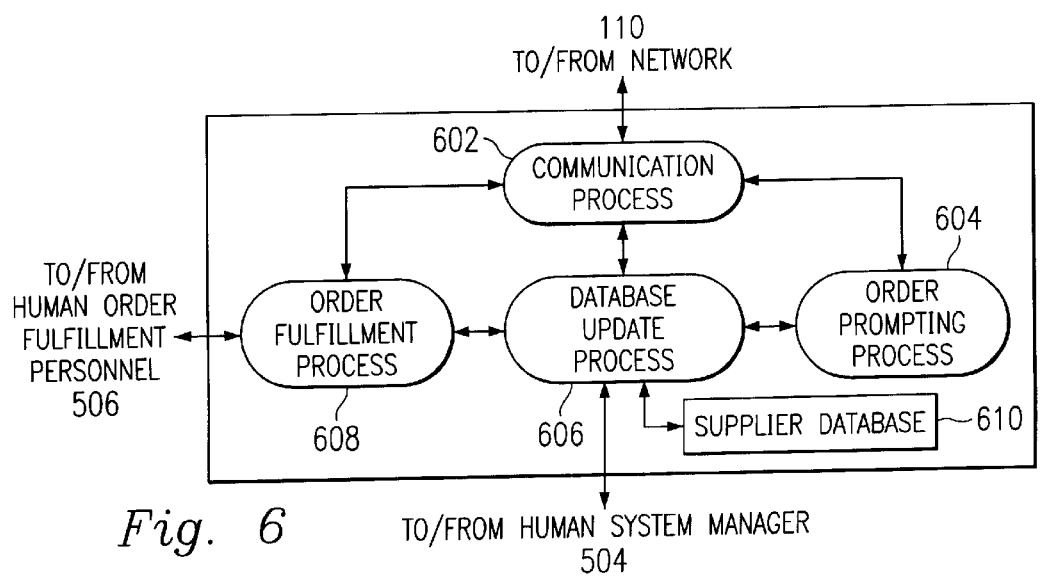
FIG. 6 is a conceptual illustration of various processes executed by a supplier administrator system of the supplier of FIG. 5.

FIG. 6 is a conceptual illustration of various processes executed by supplier administrator 502 of FIG. 5. More particularly, such processes are executed by the computing device of supplier administrator 502. The processes shown in FIG. 6 are illustrative, and not exhaustive, of the processes executed by supplier administrator 502 in general and its computing device in particular.

The processes executed by supplier administrator 502 are discussed in more detail elsewhere herein. As shown in FIG. 6, supplier administrator 502 executes a communication process 602, an order prompting process 604 (discussed further hereinbelow in connection with FIG. 11), a database update process 606, and an order fulfillment process 608.

Communication process 602 performs operations to communicate between supplier administrator 502 and network 110. Also, communication process 602 communicates with (a) order prompting process 604, (b) database update process 606, and (c) order fulfillment process 608.

Database update process 606 performs other operations of supplier administrator 502, e.g. including operations to communicate between supplier administrator 502 and human systems manager 504. Also, database update process 606 communicates with order prompting process 604 and order fulfillment process 608. Moreover, database update process 606 communicates between a supplier database 610 and other processes of system administrator 502.

Supplier database 610 is stored within a hard disk of supplier administrator 502. Supplier administrator 502 operates to store, within supplier database 610, a record of various operations performed by supplier administrator 502. By communicating with other processes of system administrator 502, database update process 606 is operable to coordinate the storing of such a record.

Order fulfillment process 608 performs operations to communicate information between supplier administrator 502 and human order fulfillment personnel 506 about delivery of physical items to customers (e.g. customers 102, 104 and 106), delivery of payment from customers, and/or return delivery of physical items from customers.

FIGS. 7, 8a and 8b are conceptual illustrations of the organization of customer database 308 according to first, second and third illustrative embodiments, respectively. As shown in FIGS. 7, 8a and 8b, customer database 308 stores various types of information. The types of information shown in FIGS. 7, 8a and 8b are illustrative, and not exhaustive, of the types of information stored by customer database 308. Accordingly, customer database 308 stores additional types of information, which are discussed further hereinbelow in connection with FIGS. 9, 10 and 11.

Referring to FIG. 7, for one or more customers (e.g. customers 102, 104 and 106), customer database 308 includes information regarding (a) the customer's name, (b) manufacturer's serial number of the customer's existing personal computer ("PC") system, (c) the customer's type, (d) dollar amount of the customer's total purchases from supplier 112 in the last year, (e) components in the customer's existing system, (f) components previously added to the customer's system from supplier 112, (g) items currently on order (e.g. purchased but not yet delivered to the customer) from supplier 112 for installation at the customer's system, (h) items returned to supplier 112 from the customer, (i) estimated time of arrival at the customer for items currently on order from supplier 112, (j) promotional items for which supplier 112 is targeting the customer, along with other preferences of the customer, and (k) system resources that are being monitored by the customer, so that the customer creates and transmits (to supplier 112) an order for purchase of a predetermined type of physical item from supplier 112 in response to such resource being absent from the customer (e.g. the customer has a low amount of such resource).

Referring to FIG. 8a, for multiple clients (e.g. clients 202, 204, 206) of a particular customer (e.g. customer 102, 104 or 106), as for example multiple client employees (or other engaged personnel) of a particular customer that is a company, customer database 308 includes information regarding (a) the employee's name (e.g. the name of human user 208, 210 or 212), (b) manufacturer's serial number of the employee's existing personal computer ("PC") system, (c) the company's asset tag number for tracking the employee's existing PC system within the company, (d) the employee's type, such as job title, (e) the employee's cost center number, (f) the employee's ranking within such cost center, (g) dollar amount of the employee's available funds for purchasing items from supplier 112, computed by customer administrator 214 in response to money available in the employee's cost center and in response to the employee's ranking within such cost center, (h) components in the employee's existing system, (i) components previously added to the employee's system from supplier 112, (j) items currently on order (e.g. purchased but not yet delivered to the employee) from supplier 112 for installation at the employee's system, (k) items returned to supplier 112 from the employee, (l) estimated time of arrival at the employee for items currently on order from supplier 112, (m) a list of items for which the employee is authorized to proactively shop and purchase from supplier 112, subject to adequacy of the employee's available funds, and (n) system resources that are being monitored by the customer, so that the customer creates and transmits (to supplier 112) an order for purchase of a predetermined type of physical item from supplier 112 in response to such resource being absent from a client (e.g. the client has a low amount of such resource).

Referring to FIG. 8b, customer database 308 includes the same types of information as shown in FIG. 8a, but customer database 308 additionally includes the customer's name (e.g. the names of customers 102 and 104, such as Acme Corporation, Inc. and Widget Corporation, Inc.). In the examples of FIGS. 7 and 8a, customer database 308 is physically resident at (and primarily maintained by) customer administrator 214, but only for the single customer 102. By comparison, in the example of FIG. 8b, unlike the examples of FIGS. 7 and 8a, customer database 308 is physically resident at (and primarily maintained by) supplier administrator 502 (FIG. 5) for multiple customers. Accordingly, in the example of FIG. 8a, customer database 308 is integrated with supplier database 610 (FIG. 6).

For clarity, in connection with the discussion of FIGS. 9, 10 and 11 below, reference is made to the organization of customer database 308 according to FIG. 8a.

FIG. 9 is a flowchart of operation of communication process 302 of customer administrator 214. At a step 902, the operation self-loops until customer administrator 214 determines that it has received a message (or "signal") from a client (e.g. any one of clients 202, 204 or 206). In response to customer administrator 214 determining (at step 902) that it has received a message from a client, the operation continues to a step 904. In the discussion below, the operation of communication process 302 is described with reference to the message being received from client 202, as an example of clients 202, 204 or 206.

At step 904, customer administrator 214 determines whether the message from client 202 is a report of a system event resulting from the absence (e.g. low amount) of a physical item (e.g. RAM or other storage space, such as hard disk space) at the computing system of client 202. In the illustrative embodiment, client 202 outputs such a message (report of a system event) in response to client 202 executing software, such as diagnostic software or application software.

Such diagnostic software includes instructions for causing client 202 to perform various operations that test its various hardware and software resources. In response to such operations, if client 202 determines that its resources lack a predetermined type of physical item, client 202 outputs the message reporting such a system event to customer administrator 214. Notably, in one embodiment, client 202 initiates execution of such diagnostic software in response to a command from customer administrator 214.

Similarly, such application software includes instructions for causing client 202 to perform various operations, some of which are capable of generating errors (e.g. interrupts, traps). In response to such operations, if client 202 determines that its resources lack a predetermined type of physical item (e.g. if a predetermined type of interrupt or trap is generated), client 202 outputs the message reporting such a system event to customer administrator 214.

If customer administrator 214 determines at step 904 that the message is a report of a system event, the operation continues to a step 906 where customer administrator 214 stores a record of the system event in customer database 308. In that manner, customer administrator 214 separately counts system events of various types for individual clients (e.g. client 202), and customer administrator 214 writes a record of such counts into customer database 308. After step 906, the operation continues to a step 908 where customer administrator 214 outputs an event notification message to ordering process 304, as discussed further hereinbelow in connection with FIG. 10, and the operation returns to step 902.

If the message is not a report of a system event, then the message is a request by user 208 (via input devices of the computing system of client 202) to proactively shop for a physical item from supplier 112. Accordingly, if customer administrator 214 determines at step 904 that the message is not a report of a system event, the operation continues to a step 910. At step 910, customer administrator 214 queries customer database 308 to determine whether information stored by customer database 308 specifies that user 208 is authorized (or "allowed") to proactively shop for a type of physical item.

If customer administrator 214 determines at step 910 that user 208 is not authorized to proactively shop for any type of physical item from supplier 112, the operation continues to a step 912. At step 912, customer administrator 214 writes a record of such request (i.e. by user 208 to proactively shop) into customer database 308. Such a stored record is beneficial for future reference by human system manager 216, as for example in determining whether to authorize user 208 to proactively shop. After step 912, the operation returns to step 902. In one example of a situation in which user 208 is not authorized to proactively shop for a physical item from supplier 112, user 208 is a customer service representative, and customer 102 specifies that all customer service representatives have identical computing systems.

If customer administrator 214 determines at step 910 that user 208 is authorized to proactively shop for at least one type of physical item from supplier 112, the operation continues to a step 914. At step 914, customer administrator 214 outputs a message to client 202 for displaying (via a display device of the computing system of client 202) the list of item(s) authorized for proactive shopping by user 208. In the illustrative embodiment, such message includes a description of all items listed in customer database 308 as "items allowed for proactive shop" under the name of user 208, and the display device (of the computing system of client 202) displays all such descriptions for viewing by user 208.

In the illustrative embodiment, such descriptions include descriptions of items that have already been purchased by user 208 through system 100 and, accordingly, are no longer available for purchase by user 208. Notably, in response to customer administrator 214 outputting a message to supplier 112 (via network 110) for purchasing an item, customer administrator 214 automatically updates such descriptions listed in customer database 308 as "items allowed for proactive shop" under the name of user 208, so that such purchased item is no longer available for purchase by user 208. In that manner, in response to such message, customer administrator 214 automatically modifies stored criteria (in customer database 308) under which user 208 is authorized to proactively shop and purchase physical items from supplier 112.

After step 914, the operation continues to a step 918 where customer administrator 214 determines whether user 208 (via the input devices of client 202) selects (or "requests") a listed item or instead declines the option to proactively shop for the listed items. If user 208 declines the option to proactively shop for the listed items, the operation continues to a step 920.

At step 920, customer administrator 214 determines whether user 208 (via the input devices of client 202) has requested and specified a comment for storage in customer database 308. For example, such comment may relate to the omission of a particular item from the listed items, such as requesting addition of the particular item to the listed items. Such a stored comment is beneficial for future reference by human system manager 216, as for example in determining whether to add a particular item to the listed items for user 208.

Accordingly, if customer administrator 214 determines at step 920 that user 208 has requested and specified a comment for storage in customer database 308, the operation continues to a step 922. At step 922, customer administrator 214 writes the specified comment into customer database, and the operation returns to step 902. Conversely, if customer administrator 214 determines at step 920 that user 208 has not requested a comment for storage in customer database 308, the operation directly returns to step 902.

Referring again to step 918, if customer administrator 214 determines that user 208 (via the input devices of client 202) selects a listed item, the operation continues to a step 924. At step 924, customer administrator 214 queries customer database 308 to determine whether information stored by customer database 308 specifies that user 208 has a monetary budget (e.g. "available funds" as shown in FIG. 8a) sufficient for purchasing the selected item. If information stored by customer database 308 specifies that user 208 has a monetary budget sufficient for purchasing the selected item, the operation continues to a step 926.

At step 926, customer administrator 214 writes a record of such selection (i.e. by user 208 of a listed item) into customer database 308. Such a record is discussed further hereinbelow in connection with FIG. 10. After step 926, the operation continues to a step 928 where customer administrator 214 outputs an event notification message to ordering process 304, as discussed further hereinbelow in connection with FIG. 10, and the operation returns to step 902.

Referring again to step 924, if information stored by customer database 308 specifies that user 208 has an insufficient monetary budget for purchasing the selected item, the operation continues to a step 930. At step 930, customer administrator 214 writes a record of such insufficiency into customer database 308. Such a stored record is beneficial for future reference by human system manager 216, as for example in determining whether to increase such monetary budget of user 208. After step 930, the operation returns to step 902.

Accordingly, information stored by customer database 308 specifies criteria under which clients (e.g. client 202) and users (e.g. user 208) are authorized to proactively shop and purchase physical items from supplier 112. Such criteria includes a client's (and/or its associated user's) monetary budget for purchasing a physical item, and/or the types of physical items for which such client (and/or its associated user) is authorized.

In response to a particular client's (and/or its associated user's) request satisfying the stored criteria for such client (and/or its associated user), customer administrator 214 outputs a signal to network 110 for purchasing a particular item which is the subject of such request. In that manner, clients (and users) are associated with respective individualized criteria. Such criteria are specified by information stored within customer database 308.

FIG. 10 is a flowchart of operation of ordering process 304 of customer administrator 214. At a step 1002, the operation self-loops until customer administrator 214 determines that a message (e.g. including at least one signal) has been output from communication process 302 to ordering process 304. In response to customer administrator 214 determining (at step 1002) that such a message has been output, the operation continues to a step 1004.

At step 1004, customer administrator 214 determines whether the message is from step 908 (resulting from a report of a system event by a client, such as client 202) of communication process 302 or, instead, from step 928 (resulting from a request by a user, such as user 208, to proactively shop for a physical item from supplier 112) of communication process 302. If customer administrator 214 determines that the message is from step 928 (request by a user, such as user 208, to proactively shop), the operation continues to a step 1006. At step 1006, customer administrator 214 creates an order for purchase of the physical item that was selected by the requesting user.

After step 1006, the operation continues to a step 1008 where customer administrator 214 decrements (in customer database 308) the dollar amount of the available funds (of the requesting user) for purchasing items from supplier 112. In that manner, in response to creating (at step 1006) the order for purchase of the physical item that was selected by the requesting user, customer administrator 214 automatically modifies stored criteria (in customer database 308) under which user 208 is authorized to proactively shop and purchase physical items from supplier 112. In the example of step 1008, the stored criteria include a monetary budget for purchasing physical items.

After step 1008, the operation continues to a step 1010 where customer administrator 214 adds the selected item to an "aggregate order list" by writing a suitable record into customer database 308. After step 1010, the operation returns to step 1002.

Referring again to step 1004, if customer administrator 214 determines that the message is from step 908 (i.e. report of a system event by a client, such as client 202), the operation continues to a step 1012. At step 1012, from customer database 308, customer administrator 214 reads the record of the system event (having an event type), together with (a) the current count of events of such event type for such client and (b) a predetermined threshold count (or "number" or "amount") of events of such event type for such client. The threshold count (of events of such event type for such client) is specified by a human system manager (e.g. by human system manager 216, or via network 110 by human system manager 504). If appropriate for a particular situation, the human system manager may specify a threshold count=1. After step 1012, the operation continues to a step 1014.

At step 1014, customer administrator 214 determines whether the current count has reached the threshold count. If the current count has not reached the threshold count, the operation returns to step 1002. If the current count has reached the threshold count, the operation continues to a step 1016.

At step 1016, from customer database 308, customer administrator 214 reads a description of a physical item associated with such event type for such client. Such description is specified by a human system manager (e.g. by human system manager 216, or via network 110 by human system manager 504). Preferably, the human system manager specifies a description of a physical item whose absence (at the computing system of such client) resulted in the system event. In that manner, the possibility of future system events (of such event type) is diminished by installation of the physical item at the computing system of such client.

After step 1016, the operation continues to step 1006, where such physical item (associated with such event type for such client) is the selected item, and where such client's associated human user is the requesting user. Accordingly, after step 1016, customer administrator 214 adds the selected item to an "aggregate order list" at step 1010 by writing a suitable record into customer database 308. As discussed further hereinbelow in connection with FIG. 11, in response to such record, customer administrator 214 outputs (to supplier 112 via network 110) a message containing an order for purchase of the selected item.

If the selected item was selected at step 1016 (i.e. in response to a system event), the selected item is being purchased for installation at the computing system of the client that reported such system event. The system event originally resulted from the absence of the selected item at such computing system.

FIG. 11 is a flowchart of operation of database update process 306 of customer administrator 214. At step 1102, customer administrator 214 determines whether database update process 306 has received a message from human system manager 216 (via input devices 404), human order fulfillment personnel 218 (via input devices 404), or supplier administrator 502 (via network 110). If customer administrator 214 determines at step 1102 that no such message has been received, the operation continues to a step 1104.

At step 1104, customer administrator 214 determines whether a time (as specified by human system manager 216 via input devices 404) has arrived to place (e.g. output to supplier 112 via network 110) an order for purchase of physical items. If not, the operation returns to step 1102. Conversely, if customer administrator 214 determines at step 1104 that a time has arrived to place an order for purchase of physical items, the operation continues to a step 1106.

At step 1106, customer administrator 214 reads selected items from the "aggregate order list" (updated by step 1010 of FIG. 10) by reading a suitable record from customer database 308. Also, at step 1106, in response to such record, customer administrator 214 outputs (to supplier 112 via network 110) a message containing an order for purchase of the selected items. After step 1106, the operation returns to step 1102.

In response to the message output at step 1106, supplier 112 delivers the selected items to customer 102 as discussed further hereinabove, as for example in connection with FIG. 6. To the extent that the selected items were selected at step 1016 of FIG. 10 (i.e. in response to system events), such selected items are being purchased for installation at the computing systems of clients that reported such system events. In that manner, system 100 responds to the system events, because the system events originally resulted from the absence of such selected items at such computing systems.

Referring again to step 1102, if customer administrator 214 determines that database update process 306 has received a message, the operation continues to a step 1108. At step 1108, customer administrator 214 determines whether database update process 306 received the message from a human (via input devices 404) or from supplier administrator 502 (via network 110). If the message was received from a human, the operation continues to a step 1110.

At step 1110, customer administrator 214 outputs (via display device 406) a message for prompting the human to select either (a) updating customer database 308, (b) outputting a message to supplier administrator 502, or (c) outputting an order to supplier administrator 502 for purchase of selected items. Also, at step 1110, customer administrator 214 determines whether the human (via input devices 404) has selected the option of updating customer database 308. If yes, the operation continues to a step 1112.

At step 1112, customer administrator 214 displays information from customer database 308 to the human through display device 406. After step 1112, the operation continues to a step 1114 where customer administrator 214 determines whether the human has requested (via input devices 404) a modification of the information stored in customer database 308. If yes, the operation continues to a step 1116 where customer administrator 214 modifies the information stored in customer database 308, in response to (and according to) the human's request (or "command"). After step 1116, the operation returns to step 1102.

For example, at steps 1114 and 1116, human system manager 216 can modify information stored within customer database 308 in a manner that:

(a) changes the list of items for which a user (e.g. user 208) is authorized to proactively shop and purchase from supplier 112, as discussed further hereinabove in connection with step 914 of FIG. 9;

(b) changes the threshold count of events of a specified event type for a specified client, as discussed further hereinabove in connection with steps 1012 and 1014 of FIG. 10; and/or (c) changes rules for automatically modifying the threshold count of events (of a specified event type for a specified client), so that customer administrator 214 modifies the threshold count according to such rules in response to a change in price and/or availability of a physical item associated with the specified event type. In response to modifying the threshold count, customer administrator 214 performs steps 1012 and 1014 (and, in some situations, steps 1016, 1006, 1008, and 1010, subject to the decision at step 1014) of FIG. 10.

Also, human order fulfillment personnel can modify information stored within customer database 308 in a manner that:

(a) indicates a specified item has been ordered;
(b) indicates a specified item has been returned; and/or
(c) indicates a specified item's estimated time of arrival from supplier 112.

Referring again to step 1114, if customer administrator 214 determines that the human has not requested a modification of the information stored in customer database 308, the operation returns to step 1102.

Referring again to step 1110, if customer administrator 214 determines that the human has not selected the option of updating customer database 308, the operation continues to a step 1118. At step 1118, customer administrator 214 determines whether the human has selected the option of outputting a message to supplier administrator 502. If yes, the operation continues to a step 1120 where customer administrator 214 outputs the human's requested message to supplier 112 through network 110. After step 1120, the operation returns to step 1102. For example, the human's requested message can include:

(a) a forecast (or "projection") of items that the human expects the customer to order in the future; and/or
(b) a query to supplier 112 about status of previously ordered items.

At step 1118, if customer administrator 214 determines that the human has not selected the option of outputting a message to supplier administrator 502, then the human has selected the option of outputting an order to supplier administrator 502 for purchase of selected items. In that event, the operation continues from step 1118 to step 1106 where customer administrator 1118 performs step 1106 for items selected (from the "aggregate order list") by the human's message. By comparison, if the operation continues from step 1104 to step 1106, customer administrator 1118 performs step 1106 for all items in the "aggregate order list."

Referring again to step 1108, if customer administrator 214 determines that database update process 306 received the message from supplier administrator 502 (via network 110), the operation continues to a step 1122. At step 1122, customer administrator 214 updates customer database 308 in response to the message. For example, messages from supplier administrator 502 can include:

(a) a forecast of change in price of an item (i.e. a projected change in price);
(b) a forecast of change in availability of an item (e.g. a foreseeable worldwide shortage of portable computers), together with a recommendation that customers purchase such item within a short time frame. (i.e. a projected change in availability);
(c) a long term change in price of an item;

(d) a short term (e.g. special promotion) change in price of an item (e.g. announcing that, if a customer purchases an item, the customer would receive free delivery of a related item);
(e) a change in availability of an item;
(f) announcement of a new item offered by supplier 112 to customers for purchase (e.g. "DVD now available for installation at existing portable computer"); and/or
(g) information about compatibility between an item and various types of computing systems.

Accordingly, such a message indicates occurrence of an event relating to an item.

In the illustrative embodiment, such messages from supplier administrator 502 originate from order prompting process 604 of FIG. 6. Notably, in supplier database 610, supplier administrator 502 maintains records of configuration for various computing systems (e.g. clients 202, 204 and 206) owned or leased by customers (e.g. customer 102). In that manner, supplier administrator 502 suitably outputs messages to customers in response to such records and newly available information.

For example, supplier administrator 502 is programmable to automatically identify situations in which new improved items (e.g. software upgrades, additional electronic circuitry, peripheral hardware devices) become available for compatible installation at customers' existing computing systems, or in which price and/or availability of items is changing. In response to identifying such situations, supplier administrator 502 automatically outputs messages to customers (e.g. to customer administrator 214 via network 110) for describing the situations. In that manner, supplier administrator 502 automatically prompts the customers to order items from supplier 112. Such prompting is convenient for the customers and economically beneficial to supplier 112.

After step 1122, the operation continues to step 1124 where customer administrator 214 displays (via display device 406) an option to human system manager 216, according to the type of update performed at step 1122. For example, the option can be:

(a) in response to announcement of a new item, addition of the new item to the list of items for which a user (e.g. user 208) is authorized to proactively shop and purchase from supplier 112, as discussed further hereinabove in connection with step 914 of FIG. 9;
(b) in response to a change in price of an item, changing the list of items for which a user (e.g. user 208) is authorized to proactively shop and purchase from supplier 112, as discussed further hereinabove in connection with step 914 of FIG. 9;
(c) in response to an actual or forecasted change in price of an item, changing rules for automatically modifying the threshold count of events (of a specified event type for a specified client);
(d) in response to a change in price of an item, rejecting an automatic modification of the threshold count of events (of a specified event type for a specified client).

After step 1124, the operation continues to a step 1126 where customer administrator 214 receives selections (if any within a predetermined time period) from human system manager 216 in response to the option displayed at step 1124. After step 1126, the operation continues to a step 1128 where customer administrator 214 updates customer database 308 in response to such selections (if any within a predetermined time period) from human system manager 216. After step 1128, the operation returns to step 1102.

Referring again to FIG. 4, computer-readable medium 410 is a floppy diskette. Computer-readable medium 410 and computer 402 are structurally and functionally interrelated with one another as described further hereinbelow. Each computing device of the illustrative embodiment is structurally and functionally interrelated with a respective computer-readable medium, similar to the manner in which computer 402 is structurally and functionally interrelated with computer-readable medium 410. In that regard, computer-readable medium 410 is a representative one of such computer-readable media, including for example but not limited to storage device 411.

Computer-readable medium 410 stores (or encodes, or records, or embodies) functional descriptive material (e.g. including but not limited to computer programs (also referred to as computer applications) and data structures). Such functional descriptive material imparts functionality when encoded on computer-readable medium 410. Also, such functional descriptive material is structurally and functionally interrelated to computer-readable medium 410.

Within such functional descriptive material, data structures define structural and functional interrelationships between such data structures and computer-readable medium 410 (and other aspects of customer administrator 214 and system 100). Such interrelationships permit the data structures' functionality to be realized. Also, within such functional descriptive material, computer programs define structural and functional interrelationships between such computer programs and computer-readable medium 410 (and other aspects of customer administrator 214 and system 100). Such interrelationships permit the computer programs' functionality to be realized.

For example, computer 402 reads (or accesses, or copies) such functional descriptive material from computer-readable medium 410 into the memory device of customer administrator 214, and customer administrator 214 performs its operations (as described elsewhere herein) in response to such material which is stored in the memory device of customer administrator 214. More particularly, customer administrator 214 performs the operation of processing a computer application (that is stored, encoded, recorded or embodied on a computer-readable medium) for causing customer administrator 214 to perform additional operations (as described elsewhere herein). Accordingly, such functional descriptive material exhibits a functional interrelationship with the way in which customer administrator 214 executes its processes and performs its operations.

Further, the computer-readable medium is an apparatus from which the computer application is accessible by computer 402, and the computer application is processable by computer 402 for causing customer administrator 214 to perform such additional operations. In addition to reading such functional descriptive material from computer-readable medium 410, customer administrator 214 is capable of reading such functional descriptive material from (or through) network 110 which is also a computer-readable medium (or apparatus). Moreover, the memory device of customer administrator 214 is itself a computer-readable medium (or apparatus).

As it can be seen, the principal advantages of these embodiments include providing a marriage of the suppliers knowledge about an initial system purchase with a corporate customer's preferences regarding currently available hardware/software items. Corporate customer guidelines make the corporate customer aware of approved and unapproved upgrade items available for upgrading the initial system.

Using a web-based tool, the corporate customer can view approved items and directly order hardware and software from the customer's desktop. All orders are tracked from a given track code. For example, the corporate customer may be authorized to order additional RAM. The amount of RAM in the initial system, and any previous orders of additional RAM are checked against the total amount of RAM the initial system can accommodate, or, the total amount of RAM authorized by the corporate customer guidelines.

Corporate customers can access an items list and browse for replacement items and upgrade items. Mandatory upgrade notification can be initiated by the supplier to provide a consistent interface to corporate customers for all system upgrades. The relationship between the supplier and the corporate customer is enhanced by creating a one-stop shopping feature for all system upgrades. Individual home users could also use the same shopping features without being restricted to choices between approved and unapproved items.

Although illustrative embodiments have been shown and described, a wide range of modification, change and substitution is contemplated in the foregoing disclosure and, in some instances, some features of the embodiments may be employed without a corresponding use of other features. Accordingly, it is appropriate that the appended claims be construed broadly and in a manner consistent with the scope of the embodiments disclosed herein.

What is claimed is:

1. A system, comprising:
    a first computing device for:
        storing criteria under which a customer is authorized to purchase a physical item;
        receiving a request from a second computing device of the customer, the request being output from the second computing device in response to the second computing device determining an absence of the physical item in the second computing device; and
        in response to the request satisfying the stored criteria, outputting a signal for purchasing the physical item for installation in the second computing device of the customer.

2. The system of claim 1 wherein the stored criteria includes a type of physical item.

3. The system of claim 1 wherein the stored criteria includes a monetary budget for purchasing the physical item.

4. The system of claim 1 wherein the first computing device is for modifying the stored criteria.

5. The system of claim 4 wherein the first computing device is for modifying the stored criteria in response to the signal.

6. The system of claim 5 wherein the stored criteria includes a monetary budget for purchasing the physical item, and wherein the first computing device is for modifying the stored criteria to reduce the monetary budget in response to the signal.

7. The system of claim 1 wherein the customer is a human user.

8. A system, comprising:
    a first computing device for:
        from a second computing device, receiving a first signal indicating occurrence of an event resulting from an absence of a physical item in the second computing device, the first signal being output from the second computing device in response to the second computing device determining the absence; and
        in response to the first signal, outputting a second signal for purchasing the physical item for installation in the second computing device.

9. The system of claim 8 wherein the event is one of multiple events resulting from the absence of the physical item in the second computing device, and wherein the first computing device is for:
- counting the multiple events; and
- outputting the second signal in response to a number of the multiple events reaching a predetermined amount.

10. The system of claim 9 wherein the first computing device is for modifying the predetermined amount.

11. The system of claim 10 wherein the first computing device is for modifying the predetermined amount in response to a command from a human.

12. A method performed by a computing system, the method comprising:
- storing criteria under which a customer is authorized to purchase a physical item;
- receiving a request from a computing device of the customer, the request being output from the computing device in response to the computing device determining an absence of the physical item in the computing device; and
- in response to the request satisfying the stored criteria, outputting a signal for purchasing the physical item for installation in the computing device.

13. The method of claim 12 wherein the storing comprises:
- storing criteria including a type of physical item.

14. The method of claim 12 wherein the storing comprises:
- storing criteria including a monetary budget for purchasing the physical item.

15. The method of claim 12 and comprising:
- modifying the stored criteria.

16. The method of claim 15 wherein the modifying comprises:
- modifying the/stored criteria in response to the signal.

17. The method of claim 16 wherein the storing comprises storing criteria including a monetary budget for purchasing the physical item, and wherein the modifying comprises modifying the stored criteria to reduce the monetary budget in response to the signal.

18. The method of claim 12 wherein the receiving comprises:
- receiving the request from the customer, the customer being a human user.

19. A method performed by a first computing device, the method comprising:
- from a second computing device, receiving a first signal indicating occurrence of an event resulting from an absence of a physical item in the second computing device, the first signal being output from the second computing device in response to the second computing device determining the absence; and
- in response to the first signal, outputting a second signal for purchasing the physical item for installation in the second computing device.

20. The method of claim 19 wherein the event is one of multiple events resulting from the absence of the physical item in the second computing device, and comprising:
- counting the multiple events, wherein the outputting comprises outputting the second signal in response to a number of the multiple events reaching a predetermined amount.

21. The method of claim 20 and comprising:
- modifying the predetermined amount.

22. The method of claim 21 wherein the modifying comprises:
- modifying the predetermined amount in response to a command from a human.

23. A computer program product, comprising:
- a computer program processable by a computing system for causing the computing system to:
  - store criteria under which a customer is authorized to purchase a physical item;
  - receive a request from a computing device of the customer, the request being output from the computing device in response to the computing device determining an absence of the physical item in the computing device; and
  - in response to the request satisfying the stored criteria, output a signal for purchasing the physical item for installation in the computing device; and
- apparatus from which the computer program is accessible by the computing system.

24. The computer program product of claim 23 wherein the stored criteria includes a type of physical item.

25. The computer program product of claim 23 wherein the stored criteria includes a monetary budget for purchasing the physical item.

26. The computer program product of claim 23 wherein the computer program is processable by the computing system for causing the computing system to modify the stored criteria.

27. The computer program product of claim 26 wherein the computer program is processable by the computing system for causing the computing system to modify the stored criteria in response to the signal.

28. The computer program product of claim 27 wherein the stored criteria includes a monetary budget for purchasing the physical item, and wherein the computer program is processable by the computing system for causing the computing system to modify the stored criteria to reduce the monetary budget in response to the signal.

29. The computer program product of claim 23 wherein the customer is a human user.

30. A computer program product, comprising:
- a computer program processable by a computing system for causing the computing system to:
  - from a computing device, receive a first signal indicating occurrence of an event resulting from an absence of a physical item in the computing device, the first signal being output from the computing device in response to the computing device determining the absence; and
  - in response to the first signal, output a second signal for purchasing the physical item for installation in the computing device; and
- apparatus from which the computer program is accessible by the computing system.

31. The computer program product of claim 30 wherein the event is one of multiple events resulting from the absence of the physical item in the computing device, and wherein the computer program is processable by the computing system for causing the computing system to:
- count the multiple events; and
- output the second signal in response to a number of the multiple events reaching a predetermined amount.

32. The computer program product of claim 31 wherein the computer program is processable by the computing system for causing the computing system to modify the predetermined amount.

33. The computer program product of claim 32 wherein the computer program is processable by the computing system for causing the computing system to modify the predetermined amount in response to a command from a human.

34. A system, comprising:
a first computing device for:
determining an absence of a physical item in the first computing device; and
in response to determining the absence, outputting a signal to a second computing device for purchasing the physical item for installation in the first computing device.

35. The system of claim 34 wherein the signal indicates occurrence of an event resulting from the absence, wherein the event is one of multiple events resulting from the absence, and wherein the first computing device is for:
counting the multiple events; and
outputting the signal to the second computing device in response to a number of the multiple events reaching a predetermined amount.

36. The system of claim 35 wherein the first computing device is for modifying the predetermined amount.

37. The system of claim 36 wherein the first computing device is for modifying the predetermined amount in response to a command from a human.

38. A method performed by a first computing device, the method comprising:
determining an absence of a physical item in the first computing device; and
in response to determining the absence, outputting a signal to a second computing device for purchasing the physical item for installation in the first computing device.

39. The method of claim 38 wherein the signal indicates occurrence of an event resulting from the absence, wherein the event is one of multiple events resulting from the absence, and comprising:
counting the multiple events, wherein the outputting comprises outputting the signal to the second computing device in response to a number of the multiple events reaching a predetermined amount.

40. The method of claim 39 and comprising:
modifying the predetermined amount.

41. The method of claim 40 wherein the modifying comprises:
modifying the predetermined amount in response to a command from a human.

42. A computer program product, comprising:
a computer program processable by a computing system for causing the computing system to:
determine an absence of a physical item in a first computing device; and
in response to determining the absence, outputting a signal to a second computing device for purchasing the physical item for installation in the first computing device; and
apparatus from which the computer program is accessible by the computing system.

43. The computer program product of claim 42 wherein the signal indicates occurrence of an event resulting from the absence, wherein the event is one of multiple events resulting from the absence, and wherein the computer program is processable by the computing system for causing the computing system to:
count the multiple events; and
output the signal to the second computing device in response to a number of the multiple events reaching a predetermined amount.

44. The computer program product of claim 43 wherein the computer program is processable by the computing system for causing the computing system to modify the predetermined amount.

45. The computer program product of claim 44 wherein the computer program is processable by the computing system for causing the computing system to modify the predetermined amount in response to a command from a human.

* * * * *